March 10, 1953

T. O. FLIPPIN 2,630,745

TRACTOR MOUNTED DISK TERRACER HAVING
A FORWARD STEERABLE GAUGE WHEEL

Filed Dec. 29, 1947

INVENTOR.
T. O. FLIPPIN
BY
ATTORNEYS

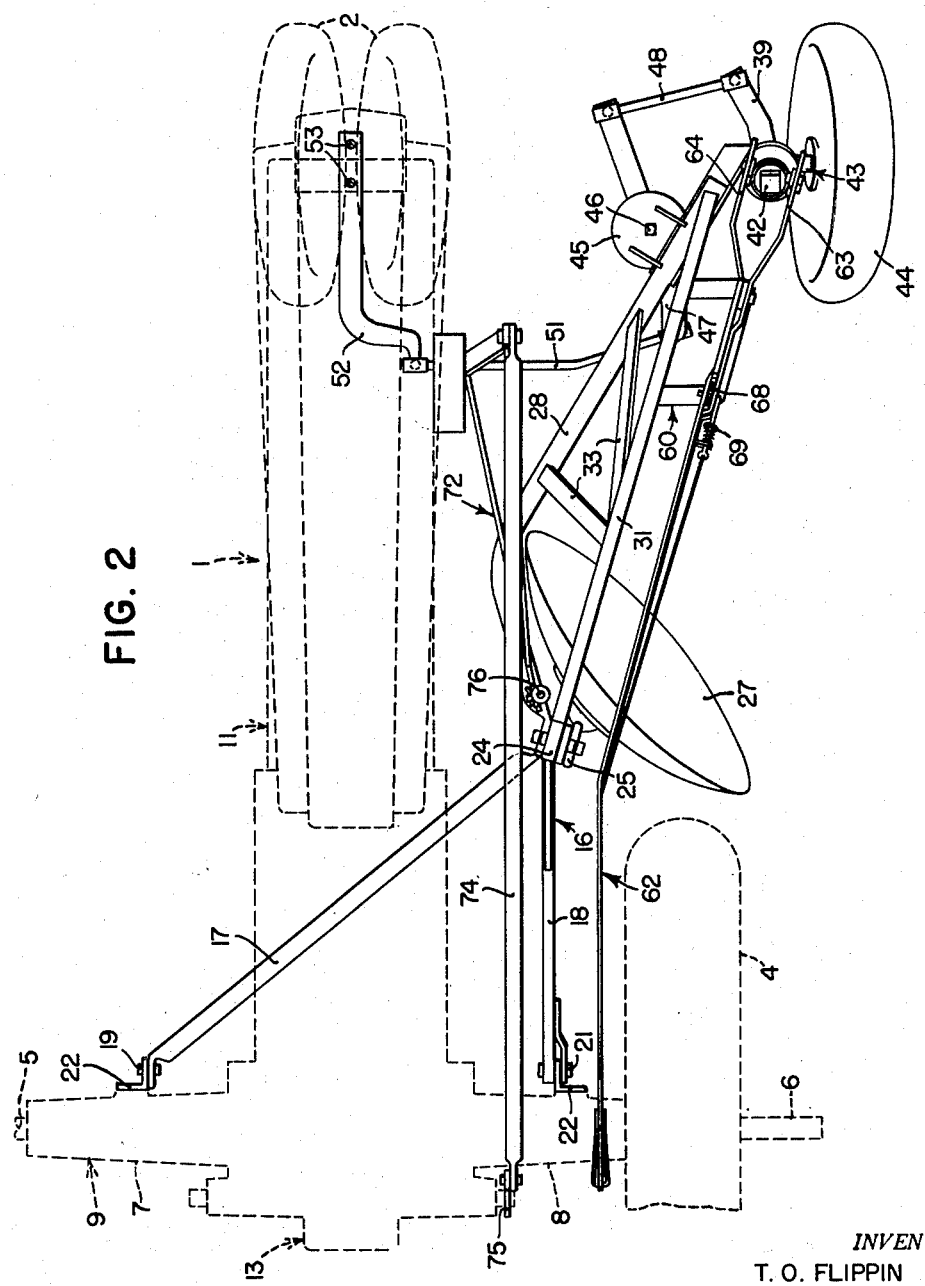

Patented Mar. 10, 1953

2,630,745

UNITED STATES PATENT OFFICE 2,630,745

TRACTOR MOUNTED DISK TERRACER HAVING A FORWARD STEERABLE GAUGE WHEEL

T. O. Flippin, Throckmorton, Tex.

Application December 29, 1947, Serial No. 794,397

2 Claims. (Cl. 97—47)

1

The present invention relates generally to agricultural implements and more particularly to tractor mounted plows in which the tractor itself serves as a supporting means for the plow.

The object and general nature of this invention is the provision of an integrally mounted disk plow having a steerable gauge wheel which is adapted to be connected with the front steering wheel means of the tractor so as to be controlled by the latter for guiding and controlling the operation of the plow disk when in working position.

Another feature of this invention is the provision of means on the disk frame for raising and lowering the latter relative to the side or gauge wheel but without interfering with the steering connections between the latter and the tractor steering mechanism.

These and other objects and advantages of the present invention will be apparent to those skilled in the art after a consideration of the following detailed description of the preferred form of my invention.

In the accompanying drawings:

Figure 2 is a plan view, the tractor being shown in dotted lines so as to illustrate the implement parts somewhat more clearly.

Figure 1:
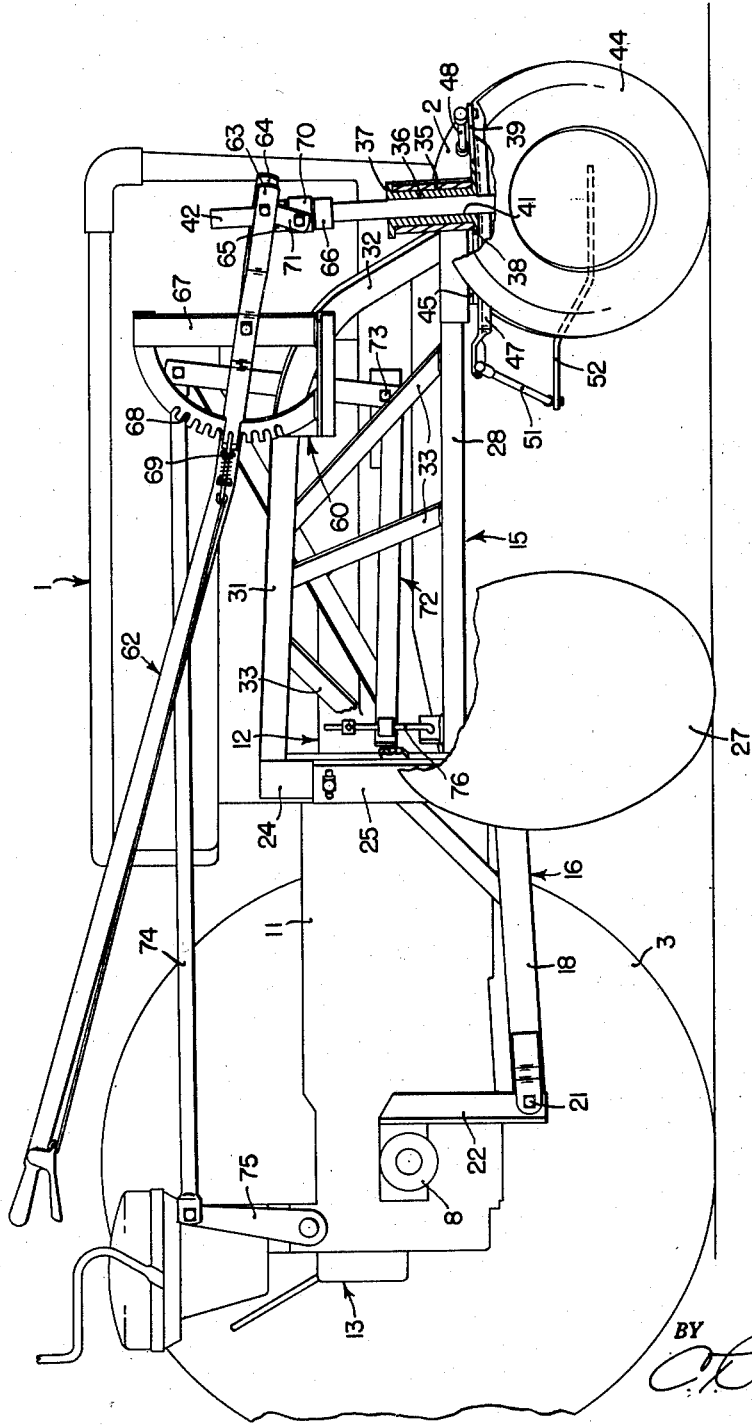
Figure 1 is a side view of an integrally mounted disk plow in which the principles of the present invention have been incorporated.

Referring now more particularly to Figures 1 and 2, the tractor is indicated in its entirety by the reference numeral 1 and preferably is of the well known tricycle type having front wheels 2 and rear traction wheels 3 and 4 secured, respectively, to axle shafts 5 and 6 mounted for rotation on extensions 7 and 8 of the tractor rear axle, which is indicated in its entirety by the reference numeral 9. The tractor 1 also includes a narrow elongated body or frame, indicated in its entirety by the reference numeral 11, which carries a source of power 12. The tractor also includes a power lift unit 13 which derives its operating energy from the power unit 10.

The implement, with which the present invention is more particularly concerned, is indicated in its entirety by the reference numeral 15 and includes a plow beam or main frame member 16. The plow beam 16 has a bifurcated rear end section formed by two members 17 and 18 which at their rear ends are apertured to receive pivots 19 and 21 by which the frame sections 17 and 18 are pivotally connected to a pair of depending brackets 22 that are fixed to the axle housing extensions 7 and 8 in any suitable manner. The generally central portion of the plow beam 15

2 comprises a vertical section 24 to which a disk standard 25 is rigidly secured, adjustably if necessary. The lower end of the disk standard 25 is formed with bearing means to receive a rotatable earth working disk 27 which, when the implement is used for terracing, may be of relatively large diameter.

In order to accommodate the relatively large disk member 27, the forward portion of the frame or plow beam 16 is made up of a laterally inwardly curved section 28 that is connected rigidly, as by welding, or the like, at its rear end to the lower portion of the vertical frame section 24, and a forwardly and downwardly curved frame section 31 which is connected at its rear end to the upper end of the vertical frame member 24 and at its forward end 32 is bent forwardly and secured rigidly, as by welding, to the forward end of the laterally inwardly curved beam section 28. Braces 33 may be provided as desired. This particular frame section accommodates the use of an extra large size disk 27 when the outfit is used for terracing.

The forward portion of the laterally inwardly curved frame section 28 is extended beyond the front end of the companion section 31 and at its forward end is secured rigidly to a vertically disposed sleeve 35 in which a relatively heavy bushing member 36 is mounted for rotation. The bushing member 36 is provided with cap sections 37 and 38, the latter being provided with or carrying a steering arm section 39. The bushing member 36 is thus held against vertical displacement relative to the sleeve 35. The member 36 is provided with a vertically disposed opening 41 polygonal in cross section and receives the vertical portion of a steering wheel spindle 42, which is likewise polygonal in cross section. The spindle section 42 forms a part of a supporting axle 43 on which a ground engaging gauge wheel 44 is mounted for rotation. A mounting plate 45 is fixed, as by welding or the like, to the front portion of the plow beam 16 and provides a pivotal support, as indicated at 46, for a lever 47 the forward end of which is connected by a steering link 48 to the front end of the steering arm 39. The rear end of the lever 47 is connected by means of a link 51 to an arm 52 which is adapted to be secured, as at 53, to the front truck or similar portion of the front wheel means 2 of the tractor. Since the arm 52 will turn whenever the front wheels of the tractor are steered, such steering motion is transmitted through the link 51 to the lever 47, and from the latter through the link 48 to the steering arm 39, whereby the gauge wheel 44 is turned a proper amount corresponding to the amount of steering action imparted to the tractor front wheels 2. The pivot connection between the ends of the link 51 and the arms 47 and 52 are in the nature of ball and socket connections so as to accommodate generally vertical movement of the plow relative to the tractor.

A laterally outwardly extending bracket 60 is fixed to the forward portion of the upper beam member 31 and provides a pivotal support for a hand lever 62 the forward portion of which is bifurcated to provide two sections 63 and 64 which are disposed on opposite sides of the upper portion of the guide wheel spindle 42. The lever 62 is pivoted on the bracket 60 on a bracket section 67 to which a sector 68 is fixed. The lever 62 carries cooperating detent means 69 whereby the hand lever 62 may be locked in different positions of adjustment.

The purpose of the hand lever 62 is to raise and lower the front end of the plow beam relative to the gauge wheel 44, and to this end the upper portion of the spindle 42 carries a pair of locking collars 65 and 66 disposed on opposite sides of a collar 70 that is rotatably disposed on the spindle 42 between the collars 65 and 66. The collar 70 carries trunnions that are connected by links 71 with the bifurcated portions 63 and 64 of the hand lever 62. By changing the position of the hand lever 62, the gauge wheel 44 may be raised and lowered relative to the disk plow beam 16 so as to determine the operating depth of the disk, and the steering links 48 and 51 are made adjustable in length so that the desired amount of lead may be given to the gauge wheel 44 so that the latter serves not only to gauge the operating depth of the tool but also aids in holding the tool in the proper position laterally, thus relieving the tractor of an appreciable portion of the side thrust of the tool. The beam 16 is, of course, laterally rigid by virtue of the rear bifurcated portion of the plow beam and its pivotal connection with opposite side portions of the rear axle of the tractor. However, since the disk 27 is disposed at one side of the tractor, particularly at one side of the center of pressure at which the forward motion of the tractor is applied to the main frame 16, there may be a tendency for the soil pressure acting against the disk to swing the frame to the right by an amount somewhat in excess of the tendency of the disk itself to run toward the left, and the gauge wheel 44 is adjusted to tend to lead slightly toward the left. This not only has the effect of insuring that the wheel runs along fairly close to the furrow wall, but in addition it materially improves the steerability of the outfit as a whole.

A bell crank 72 is mounted on a stud 73 carried by the front portion of the tractor. One part of the bell crank 72 is connected by a lift pipe 74 to an arm 75 that forms a part of the tractor power lift 13. The other arm of the bell crank 72 is connected by a lost motion linkage 76 to the plow beam 16. Normally, when the outfit is in operation, there is sufficient lost motion between the beam and the bell crank 72 to provide for a plow following irregularities in the ground independent of the tractor, the plow being controlled substantially entirely by the steerable gauge wheel 44. When it is desired to transport the outfit, the tractor power lift is actuated to rock the bell crank 72 in a direction to raise both the plow disks and the gauge wheel 44 out of contact with the ground, whereupon the entire outfit is supported on the tractor and may be readily driven from place to place as desired.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A disk plow adapted to be attached to a tractor having a rear axle and front dirigible wheel means, said plow comprising a plow beam including a rear bifurcated portion, the rear ends of which are adapted to be pivotally connected to the rear axle structure of the tractor, a vertical section connected at its lower portion rigidly to the forward portion of said rear bifurcated section, and an upper downwardly curved section connected at its rear portion to the upper portion of said vertical section, a ground working disk connected to said vertical section and disposed at least partially underneath the rear portion of said upper downwardly curved section, and supporting means connected with the front portion of said upper downwardly curved section of the plow beam.

2. An earth-working implement adapted to be mounted on a tractor of the tricycle type having a rear axle, laterally spaced rear wheels, a relatively narrow body, and centrally disposed steerable front wheel means, said implement comprising a beam structure including bars forming a rearwardly diverging forked portion and a generally upwardly arched front portion secured at its rear end to the forward ends of said bars, a ground-working disk connected to the front ends of said rearwardly disposed bars and disposed at least partially under said upwardly arched beam portion, the latter extending forwardly and laterally outwardly to a point generally laterally opposite said front wheel means, said bars being disposed to position said ground-working disk at least partially in front of the associated rear tractor wheel at that side of the tractor, a ground-engaging steerable wheel connected to the front end of said arched beam portion and disposed to operate in a previously opened furrow and leading toward the furrow wall, and a laterally extending steering connection for operatively connecting said steerable wheel with said tractor front wheel means.

T. O. FLIPPIN.

REFERENCES CITED

The following references are of record in the file of this patent:

UNITED STATES PATENTS

| Number | Name | Date |
| --- | --- | --- |
| 1,361,638 | Stephenson | Dec. 7, 1920 |
| 1,611,540 | McAllister | Dec. 21, 1926 |
| 1,854,834 | Graham | Apr. 19, 1932 |
| 2,041,832 | Hester | May 26, 1936 |
| 2,059,140 | Oldendorf | Oct. 27, 1936 |
| 2,227,423 | Boyd | Jan. 7, 1941 |
| 2,307,980 | Avrett, Jr. | Jan. 12, 1943 |
| 2,372,459 | Todd | Mar. 27, 1945 |